United States Patent
Chang

(10) Patent No.: US 9,868,224 B2
(45) Date of Patent: Jan. 16, 2018

(54) BAND SAW MACHINE WITH DISK BRAKE DEVICE

(71) Applicant: KING SAW MACHINERY LTD., Taichung (TW)

(72) Inventor: Chin-Feng Chang, Taichung (TW)

(73) Assignee: King Saw Machinery Ltd., Taichung (TW)

( * ) Notice: Subject to any disclaimer, the term of this patent is extended or adjusted under 35 U.S.C. 154(b) by 283 days.

(21) Appl. No.: 14/681,070

(22) Filed: Apr. 7, 2015

(65) Prior Publication Data
US 2016/0297094 A1 Oct. 13, 2016

(51) Int. Cl.
B27B 13/14 (2006.01)
B23D 59/00 (2006.01)
B27G 19/06 (2006.01)

(52) U.S. Cl.
CPC .......... B27B 13/14 (2013.01); B23D 59/001 (2013.01); B27G 19/06 (2013.01)

(58) Field of Classification Search
CPC .............. B27B 13/14; B27B 5/38; Y10T 83/081–83/099; B27G 19/06; B23D 59/001; B23D 55/06; F16D 65/06; Y10S 83/01
USPC ...................... 83/DIG. 1, 68, 62.1
See application file for complete search history.

(56) References Cited

U.S. PATENT DOCUMENTS

| | | | | |
|---|---|---|---|---|
| 1,450,906 A | * | 4/1923 | Anderson | B27B 5/38 192/224.1 |
| 1,516,529 A | * | 11/1924 | Hall | B23D 53/12 30/380 |
| 1,591,247 A | * | 7/1926 | Tannewitz | B27B 13/14 83/815 |
| 1,927,203 A | * | 9/1933 | De Groot | B27B 13/14 83/62.1 |
| 2,286,589 A | * | 6/1942 | Tannewitz | B27B 13/14 83/62.1 |
| 2,434,174 A | * | 1/1948 | Morgan | B27B 13/14 188/65.1 |

(Continued)

FOREIGN PATENT DOCUMENTS

| | | | | |
|---|---|---|---|---|
| CN | 204545577 U | * | 8/2015 | B23F 55/06 |
| FR | 2703943 A1 | * | 10/1994 | B27B 13/14 |

(Continued)

*Primary Examiner* — Laura M Lee
(74) *Attorney, Agent, or Firm* — Raymond Y. Chan; David and Raymond Patent Firm

(57) ABSTRACT

A band saw machine with a disk brake device is provided. A lower gravity wheel is provided with a disk which is turned synchronously. The circumferential edge of the disk is provided with a brake seat. A brake wire provided at the bottom of the band saw machine is connected with a brake lever which can be pivoted. The upper end of the brake lever is in contact with a micro switch seat. Thereby, when the brake lever is pressed, the upper end of the brake lever is away from the micro switch seat, such that the band saw machine is cut off the power supply to stop running. The brake wire links the crank of the brake seat. The brake seat brings a brake action to the disk, such that the lower gravity wheel stops running so as to stop the operation of the saw band of the band saw machine. The present invention provides practical effects of emergent stopping and safety.

5 Claims, 5 Drawing Sheets

(56) References Cited

U.S. PATENT DOCUMENTS

| | | | | |
|---|---|---|---|---|
| 2,604,126 | A | * | 7/1952 | Wiken ................... B23D 55/02 |
| | | | | 474/115 |
| 3,456,695 | A | * | 7/1969 | Akrenius ................ B27B 13/14 |
| | | | | 192/135 |
| 4,117,752 | A | * | 10/1978 | Yoneda ................ B23D 59/001 |
| | | | | 192/129 A |
| 5,272,946 | A | * | 12/1993 | McCullough ........... B27B 13/14 |
| | | | | 192/129 A |
| 2016/0297094 | A1 | * | 10/2016 | Chang ..................... B27B 13/14 |

FOREIGN PATENT DOCUMENTS

| | | | | | |
|---|---|---|---|---|---|
| FR | 2739586 | A1 | * | 4/1997 | ............. B27B 5/224 |
| GB | 1445819 | A | * | 8/1976 | ............. B23D 55/02 |
| TW | 502524 | U | * | 6/2015 | ............. B23D 55/00 |

* cited by examiner

BAND SAW MACHINE WITH DISK BRAKE DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a band saw machine and more particularly to a band saw machine with a disk brake device. A lower gravity wheel of the band saw machine is provided with a disk and a brake seat, with a brake lever to cut off the power supply so as to stop running of the saw band of the band saw machine immediately.

Description of Related Arts

A conventional vertical band saw machine comprises upper and lower gravity wheels at upper and lower ends thereof and an annular metallic saw band riding on the upper and lower gravity wheels. The lower gravity wheel is provided with a driven wheel. A motor is provided with a drive wheel to drive the driven wheel to bring the saw band for cutting. In an emergency, an emergent stop button is used to cut off the power supply which drives the drive wheel of the motor, so that the upper and lower gravity wheels stop running. However, due to the inertia of the upper and lower gravity wheels, they continue to turn momently so the saw band don't stop cutting immediately. That is to say, in an emergency, the band saw machine is unable to stop all running immediately. It is inconvenient for use, and an accident may happen. In view of this, it is necessary to improve the safety and convenience of the band saw machine in an emergency. Accordingly, the inventor of the present invention has devoted himself based on his many years of practical experiences to solve these problems.

SUMMARY OF THE PRESENT INVENTION

The primary object of the present invention is to provide a band saw machine with a disk brake device to solve the above-mentioned problems.

In order to achieve the aforesaid object, a lower gravity wheel is provided with a disk which is turned synchronously. The circumferential edge of the disk is provided with a brake seat. A brake wire is connected with a brake lever which can be pivoted. The upper end of the brake lever is in contact with a micro switch seat. Thereby, when the brake lever is pressed, the upper end of the brake lever is away from the micro switch seat, such that the band saw machine is cut off the power supply to stop running. The brake seat brings a brake action to the disk so as to stop the operation of the saw band of the band saw machine. The present invention provides practical effects of emergent stopping and safety.

DETAILED DESCRIPTION OF THE PREFERRED EMBODIMENT

Embodiments of the present invention will now be described, by way of example only, with reference to the accompanying drawings.

Figure 1:
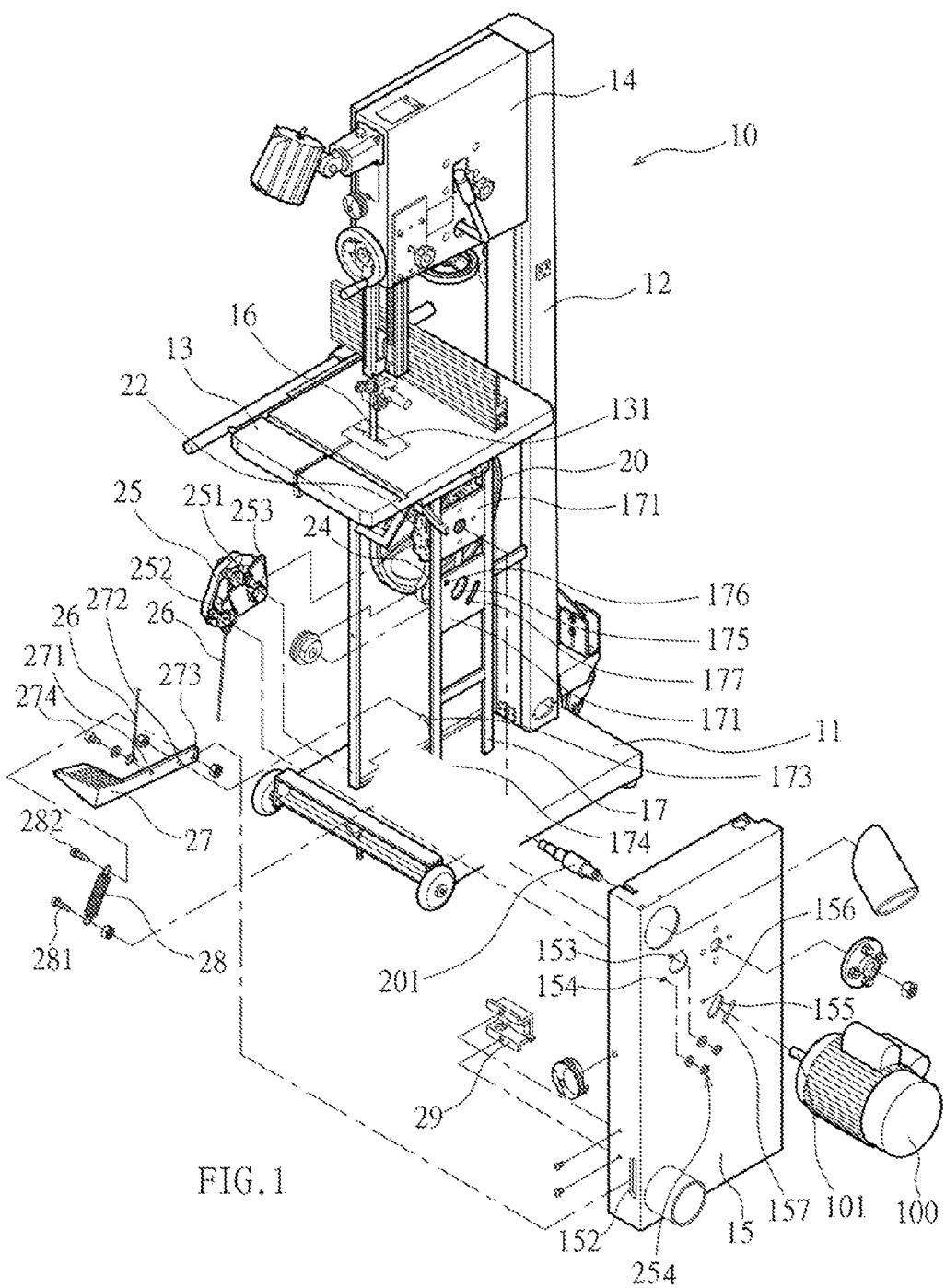
FIG. 1 is an exploded view of the present invention.
Figure 2:
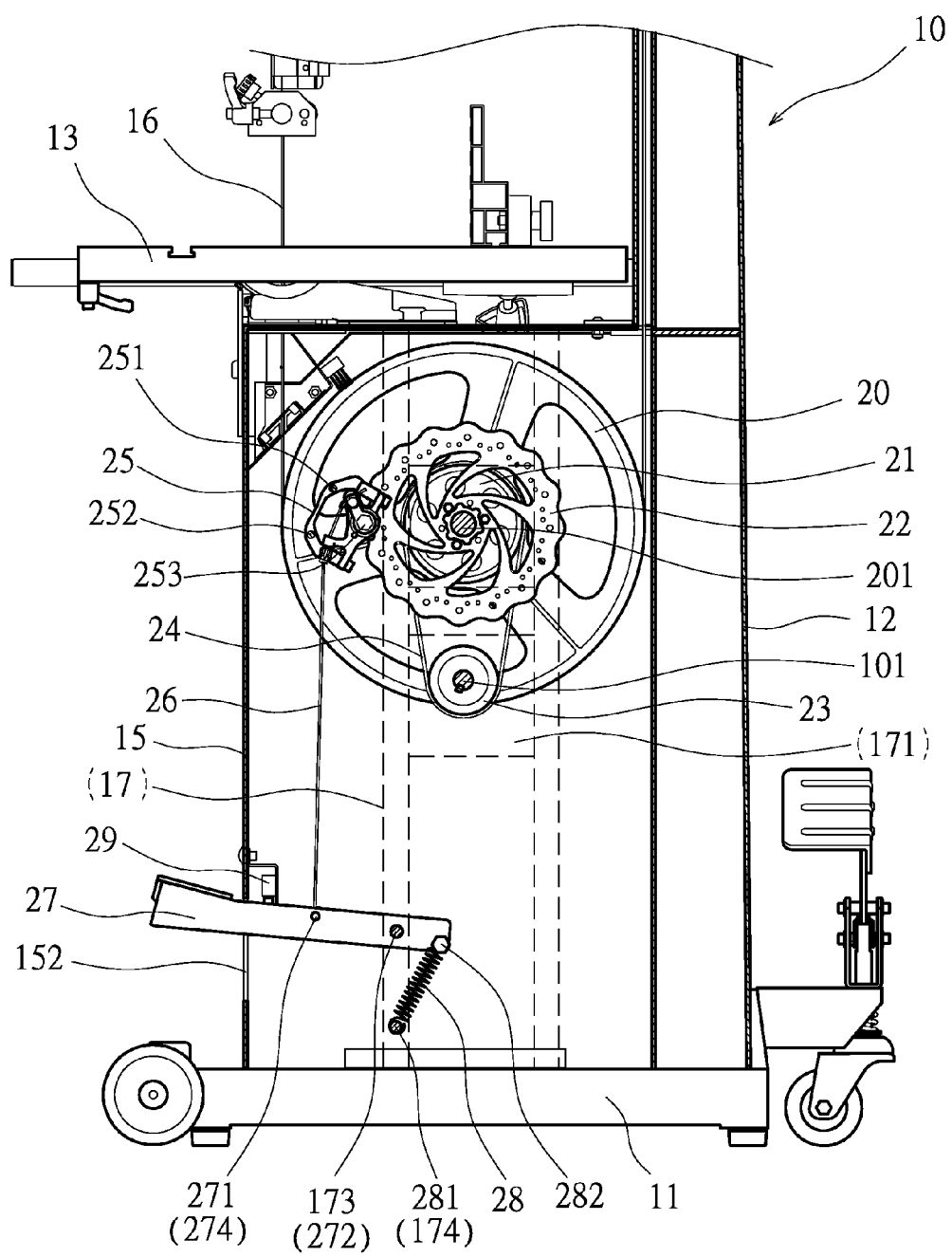
FIG. 2 is a side sectional view of the present invention.

As shown in FIG. 1 and FIG. 2, the present invention discloses a band saw machine with a disk brake device. A vertical saw band machine 10 comprises a base 11, a vertical post 12 mounted on the base 11, a worktable 13 disposed at a middle portion of the vertical post 12, an upper wheel box 14 disposed above the worktable 13 and coupled to the vertical post 12, a lower wheel box 15 disposed under the worktable 13 and coupled to the vertical post 12, and a saw band 16. The worktable 13 has a through trough 131 thereon. The lower wheel box 15 comprises a support member 17 having a flat surface 171. The flat surface 171 is pivotally connected with a lower gravity wheel 20 through a wheel axle 201. The lower gravity wheel 20 comprises a driven wheel 21 to be turned synchronously. A drive wheel 23 is disposed under the driven wheel 21 and driven by an axle 101 of a motor 100. A drive belt 24 is fitted on the drive wheel 23 and the driven wheel 21, enabling the lower gravity wheel 20 to turn. The saw band 16 is an annular metallic band passing through the upper wheel box 14, the through trough 131 of the worktable 13, and the lower gravity wheel 20 of the lower wheel box 15 to be turned circularly. Wherein, the lower gravity wheel 20 is provided with a disk 22 to be turned synchronously. The lower wheel box 15 is provided with a brake seat 25 having a crank 253. The brake seat 25 is coupled to an outer edge of the disk 22. The support member 17 includes a positioning shaft 173 and a through hole 174. The positioning shaft 173 and the through hole 174 are disposed close to the base 11. The positioning shaft 173 is pivotally connected with a brake wire 26 to pull a brake lever 27 of the crank 253. An upper end of the brake lever 27 is provided with a micro switch seat 29. An elastic member 28 is provided between a distal end of the brake lever 27 and the through hole 174 of the support member 17.

By the aforesaid device, when the brake lever 27 is pressed, its distal end is to pull the elastic member 28 and its upper end is away from the micro switch seat 29, such that the band saw machine 10 is cut off the power supply to stop running. The brake wire 26 links the crank 253 of the brake seat 25. The brake seat 25 brings a brake action to the disk 22, such that the lower gravity wheel 20 stops running so as to stop the operation of the saw band 16 of the band saw machine 10. The present invention provides practical effects of emergent stopping and safety.

The details of the assembly of the present invention are described hereinafter. Referring to FIG. 1 and FIG. 2, the brake seat 25 of the present invention is provided with a first fixing rod 251 and a second fixing rod 252. The surface of the lower wheel box 15 has a first coupling hole 153 and a second coupling hole 154 corresponding in position to the first fixing rod 251 and the second fixing rod 252 respectively, such that the brake seat 25 is fixed to the lower wheel box 15 by cooperating with nuts 254. The outer circumferential edge of the disk 22 passes through the calipers inside the brake seat 25 with the brake wire 26 to pull and turn the crank 253, such that the calipers clamp the disk 22 to generate friction so as to stop the lower gravity wheel 20. This is prior art, and won't be described hereinafter. The brake lever 27 has a first through hole 271, a second through hole 272, and a third through hole 273 arranged in sequence. The positioning shaft 173 of the support member 17 is pivotally connected with the second through hole 272. The brake wire 26 is connected with the first through hole 271 by cooperating with a bolt 274. The elastic member 28 and the brake wire 26 are arranged in opposing directions. One end of the elastic member 28 is connected with the through hole 174 of the support member 17 by cooperating with a bolt 281. Another end of the elastic member 28 is connected with the third through hole 273 by cooperating with a bolt 282 to generate an elastic pull force. An outer end of the brake member 27 is inserted through a slot 152 of the lower wheel box 15 to extend out of the band saw machine 10, so that the brake lever 27 can be conveniently controlled by stomping.

Figure 3:
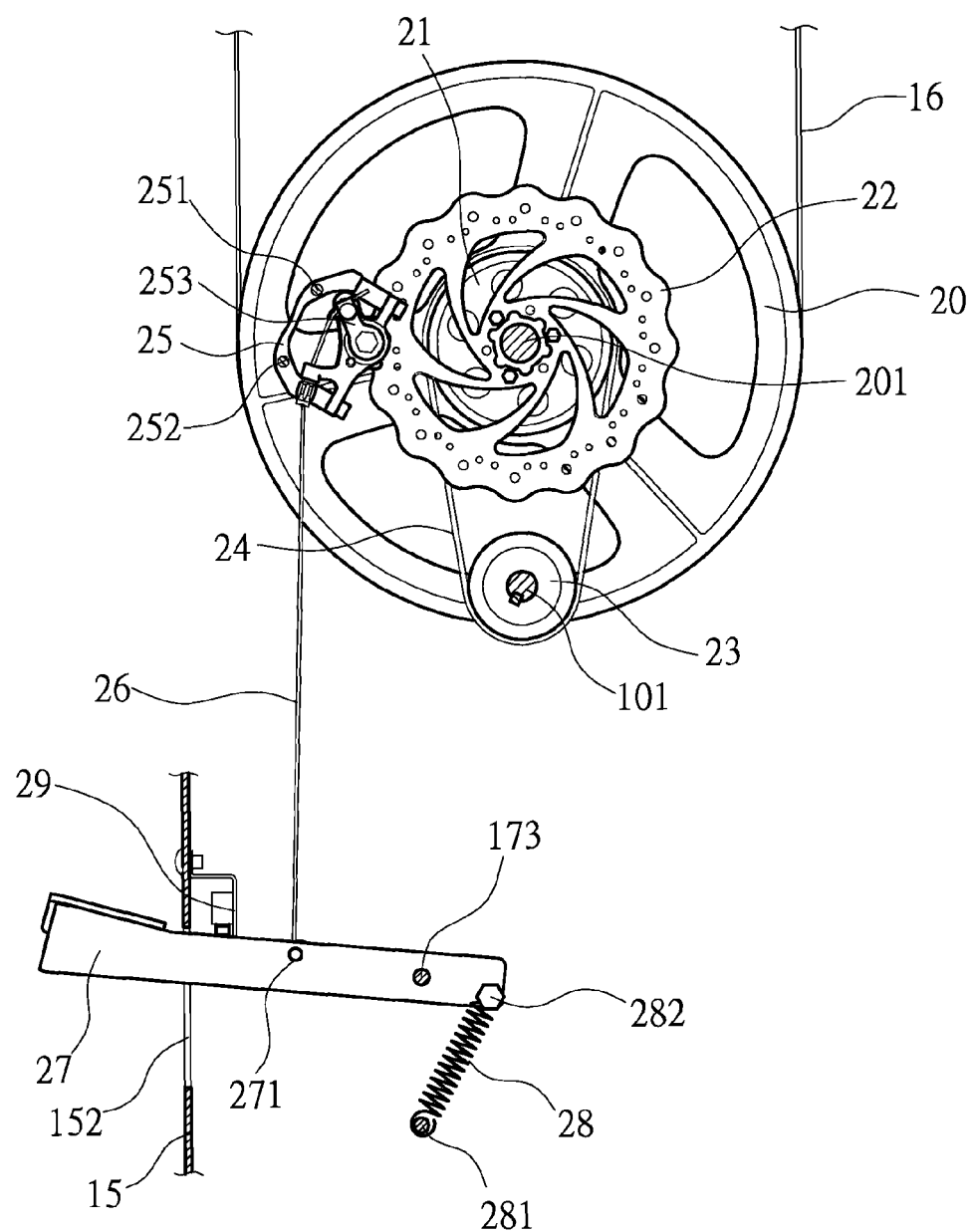
FIG. 3 is a schematic view of the present invention, not in a brake state.

Referring to FIG. 3, the distal end of the brake lever 27 is tilted upward by the elastic pull force of the elastic member 28 to get contact with the micro switch seat 29. The brake wire 26 is in a loosening state, enabling the crank 253 of the brake seat 25 not subject to the pull force to turn. Thus, the motor 100 supplies power normally for operation. The brake seat 25 won't generate a brake action to the disk 22.

Figure 4:
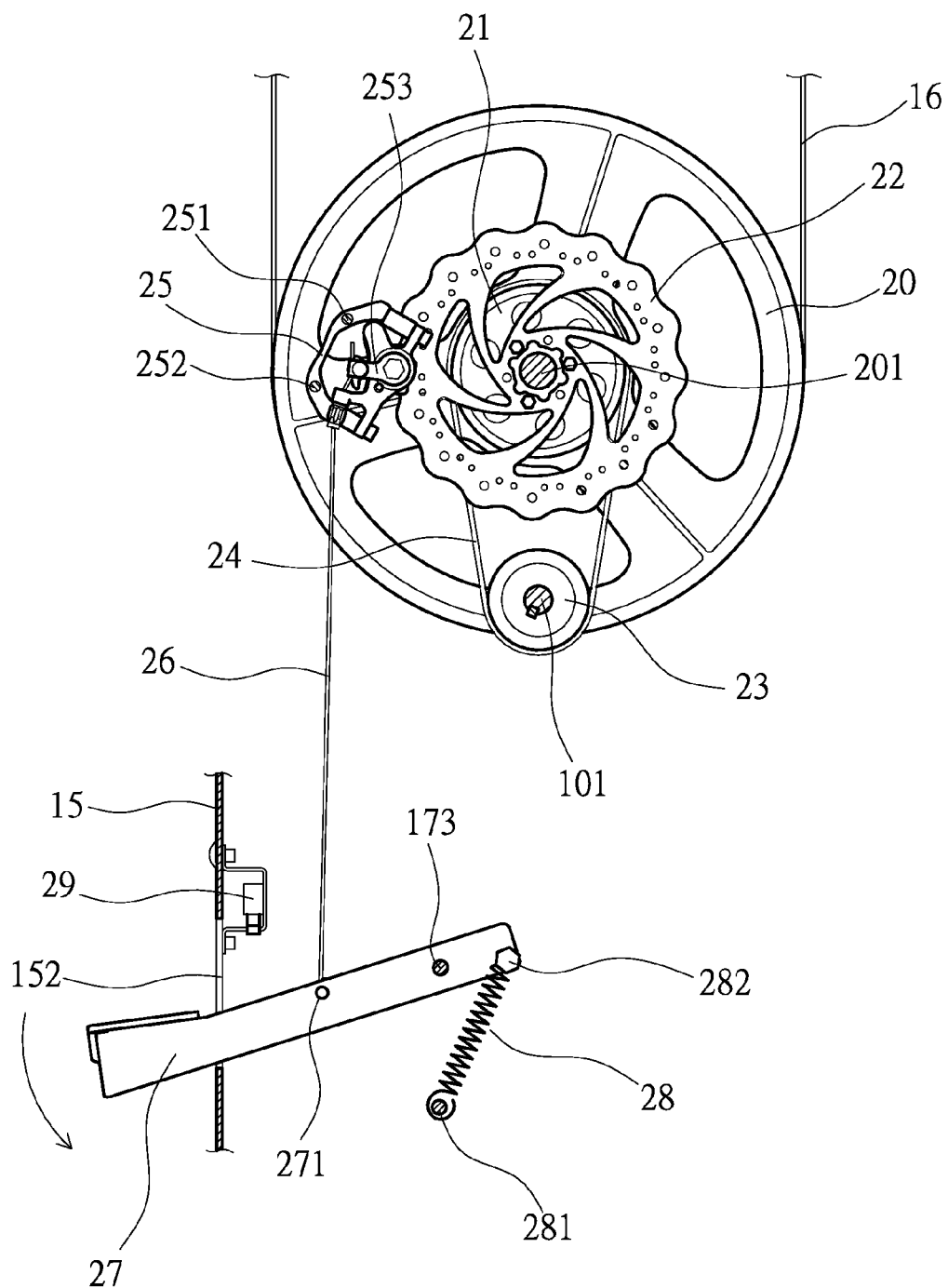
FIG. 4 is a schematic view of the present invention, in a brake state.

Referring to FIG. 4, in an emergency, the end of the brake lever 27 is stamped with the positioning shaft 173 as a pivot, therefore, the distal end of the brake lever 27 is tilted upward to pull the elastic member 28 to form a greater elastic pull force. On the contrary, the end the brake lever 27 is pressed down to be away from the micro switch seat 29 in a release state, such that the power supply is cut off and the motor 100 stops running immediately. At the same time, the brake lever 27 pulls the brake wire 26, enabling the crank 253 of the brake seat 25 to turn by the pull force. Therefore, the brake seat 25 generates a brake action to the disk 22, such that the lower gravity wheel 20 stops running immediately further to stop the cutting operation of the saw band 16. This achieves the practical effects of emergent stopping and safety. When the lower gravity wheel 20 stops running totally, the brake lever 27 is released and pulled by the elastic member 28 to tilt upward and hold against the micro switch seat 29. The brake wire 26 is in a releasing state again. Although the micro switch seat 29 is pressed again, it won't supply power to the motor 100 immediately. It is necessary to switch off the power and then switch it on again through a master switch, enabling the motor 100 to start normally. Thus, the band saw machine 10 won't start the motor 100 suddenly because the brake lever 27 is bounded, so it is safe for use.

Figure 5:
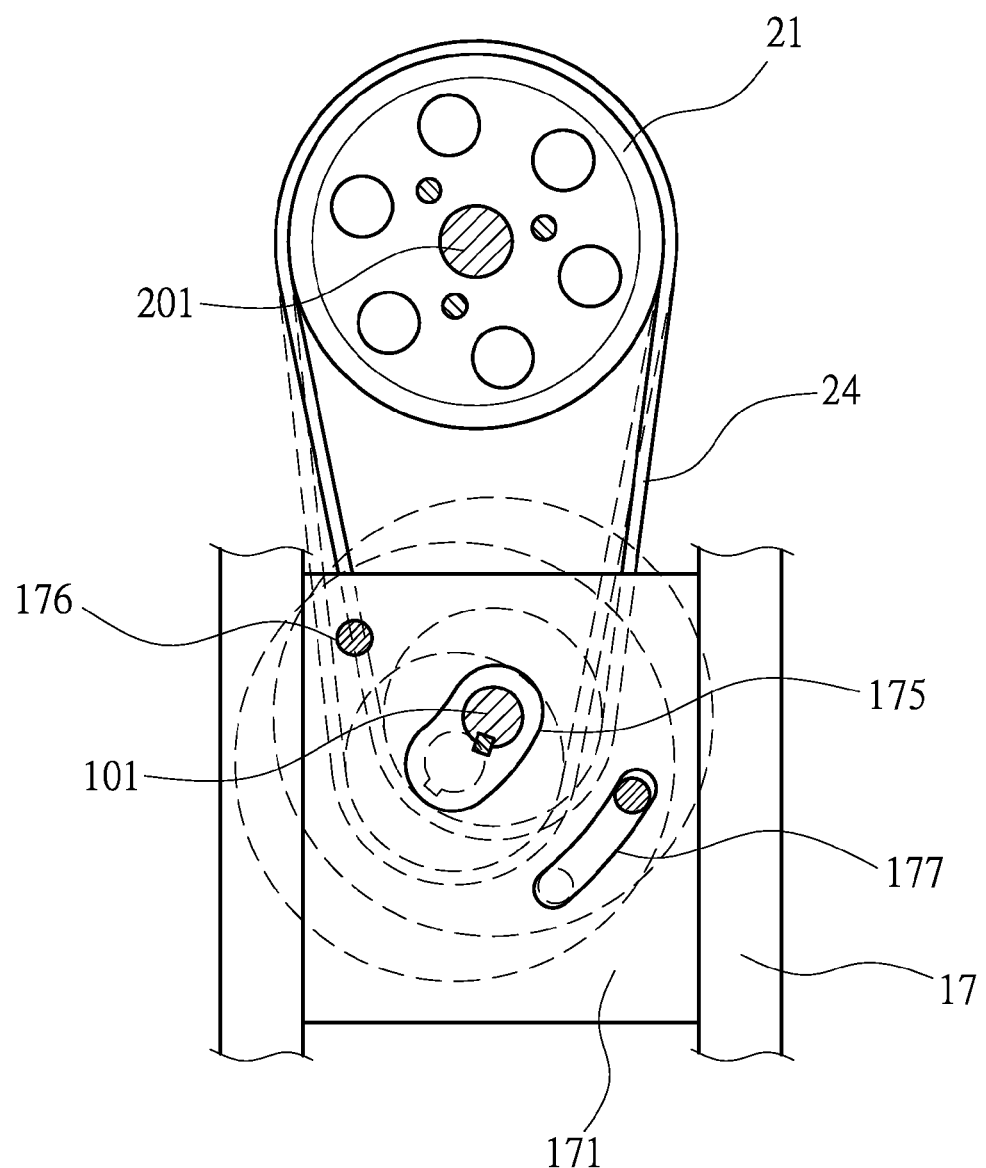
FIG. 5 is a schematic view of the present invention, showing adjustment of the drive belt.

Referring to FIG. 1 and FIG. 5, the surface of the lower wheel box 15 has an outer curved axle hole 155, an outer locking hole 156, and an outer curved locking hole 157. The flat surface 171 of the support member 17 has an inner curved axle hole 175, an inner locking hole 176, and an inner curved locking hole 177 corresponding in position to the outer curved axle hole 155, the outer locking hole 156, and the outer curved locking hole 157 respectively. The axle 101 of the motor 100 passes through the outer and inner curved axle holes 155, 175 from the outside of the lower wheel box 15 and are locked to the outer and inner locking holes 156, 176 by cooperating with bolts. The other side is locked to the outer and inner curved locking holes 157, 177. The motor 100 uses the outer and inner locking holes 156, 176 as the axle center to deflect so as to adjust the tension of the drive belt 24, proving a more practical and convenient effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A band saw machine with a disk brake device, the band saw machine comprising a base, a vertical post mounted on the base, a worktable disposed at a middle portion of the vertical post, an upper wheel box disposed above the worktable and coupled to the vertical post, a lower wheel box disposed under the worktable and coupled to the vertical post, and a saw band, the worktable having a through trough thereon, the lower wheel box comprising a support member having a flat surface, a lower gravity wheel being pivotally connected with the flat surface through a wheel axle, the lower gravity wheel comprising a driven wheel which is to be turned synchronously with the lower gravity wheel, a drive wheel being disposed under the driven wheel and driven by an axle of a motor, a drive belt being fitted on the drive wheel and the driven wheel, enabling the lower gravity wheel to turn, the saw band being an annular metallic band passing through the upper wheel box, the through trough of the worktable, and the lower gravity wheel of the lower wheel box to be turned circularly, characterized by: the lower gravity wheel being provided with a disk, wherein the lower gravity wheel is to be turned synchronously with the disk; the lower wheel box being provided with a brake seat having a crank, the brake seat being coupled to an outer edge of the disk; the support member including a positioning shaft and a through hole, the positioning shaft and the through hole being disposed close to the base, the positioning shaft being pivotally connected with a brake wire to pull a brake lever of the crank, an upper end of the brake lever is provided with a micro switch seat, an elastic member being provided between a distal end of the brake lever and the through hole of the support member; thereby, when the brake lever is pressed, the act of pressing the brake lever moves the upper end of the brake lever away from the micro switch seat, enabling the motor to stop running, and the brake wire links the crank to bring a brake action relative to the disk for an emergent stopping.

2. The band saw machine with a disk brake device as claimed in claim 1, wherein the brake seat is provided with a first fixing rod and a second fixing rod, a surface of the lower wheel box has a first coupling hole and a second coupling hole corresponding in position to the first fixing rod and the second fixing rod respectively, and the brake seat is fixed to the lower wheel box by cooperating with nuts.

3. The band saw machine with a disk brake device as claimed in claim 1, wherein the brake lever has a first through hole, a second through hole, and a third through hole arranged in sequence, the positioning shaft of the support member is pivotally connected with the second through hole, the brake wire is connected with the first through hole, one end of the elastic member is connected with the through hole of the support member, and another end of the elastic member is connected with the third through hole.

4. The band saw machine with a disk brake device as claimed in claim 1, wherein an outer end of the brake lever is inserted through a slot of the lower wheel box to extend out of the band saw machine.

5. The band saw machine with a disk brake device as claimed in claim 1, wherein a surface of the lower wheel box has an outer curved axle hole, an outer locking hole, and an outer curved locking hole, the flat surface of the support member has an inner curved axle hole, an inner locking hole, and an inner curved locking hole corresponding in position to the outer curved axle hole, the outer locking hole, and the outer curved locking hole respectively, the axle of the motor passes through the outer and inner curved axle holes with one side of the axle of the motor locked to the outer and inner locking holes and another side of the axle of the motor locked to the outer and inner curved locking holes.

* * * * *